US009253324B1

(12) United States Patent
Darby et al.

(10) Patent No.: US 9,253,324 B1
(45) Date of Patent: *Feb. 2, 2016

(54) PROVIDING AGENT AVAILABILITY FOR AN OUTDIAL APPLICATION

(71) Applicant: West Corporation, Omaha, NE (US)

(72) Inventors: Kenneth A. Darby, Papillion, NE (US); Jason J. Kroh, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,882

(22) Filed: Nov. 7, 2014

Related U.S. Application Data

(63) Continuation of application No. 14/212,210, filed on Mar. 14, 2014, now Pat. No. 8,897,439, which is a continuation of application No. 11/864,075, filed on Sep. 28, 2007, now Pat. No. 8,693,674.

(51) Int. Cl.

| *H04M 5/00* | (2006.01) |
|---|---|
| *H04M 3/00* | (2006.01) |
| *H04M 3/51* | (2006.01) |
| *H04M 3/523* | (2006.01) |

(52) U.S. Cl.
CPC .......... *H04M 3/5158* (2013.01); *H04M 3/5233* (2013.01)

(58) Field of Classification Search
CPC ..... H04M 3/523; H04M 3/51; H04M 3/5175; H04M 2203/2061
USPC ............... 379/265.01, 265.02, 235.05, 265.1, 379/265.11–265.13, 266.01, 266.07–266.08
See application file for complete search history.

(56) References Cited

U.S. PATENT DOCUMENTS

| 5,640,445 | A * | 6/1997 | David | H04M 3/51 379/112.01 |
|---|---|---|---|---|
| 6,754,236 | B1 * | 6/2004 | Strandberg | H04M 3/5158 370/524 |
| 7,133,520 | B1 * | 11/2006 | Doyle | H04M 3/5233 379/265.01 |
| 7,184,541 | B2 * | 2/2007 | Tyagarajan | H04M 3/5234 379/265.02 |
| 7,873,157 | B1 * | 1/2011 | Sim | H04M 3/5232 379/265.01 |
| 2003/0231647 | A1 * | 12/2003 | Petrovykh | H04L 12/58 370/429 |
| 2004/0083099 | A1 * | 4/2004 | Scarano | G06F 17/30746 704/231 |
| 2004/0170258 | A1 * | 9/2004 | Levin | H04M 1/274575 379/88.01 |
| 2006/0104433 | A1 * | 5/2006 | Simpson | H04M 3/5158 379/266.07 |
| 2007/0041562 | A1 * | 2/2007 | Bernier | H04M 3/58 379/265.01 |
| 2007/0121894 | A1 * | 5/2007 | Noble | H04M 3/5158 379/265.02 |

\* cited by examiner

*Primary Examiner* — Oleg Asanbayev

(57) ABSTRACT

A system, method, and computer readable medium for utilizing agent availability by an outdial application are provided. A routine may be periodically run by an outdial server that evaluates agent availability in a call center backend. If any agents are available, the routine may schedule a pre-defined number of calls per available agent. A number of phone numbers corresponding to the number of scheduled calls may then be fetched by the routine from a phone number database. Once calls are initiated by the outdial server, the routine again checks if any agents are available. In the event that an agent is available, a scheduled phone number is retrieved, and a call is placed thereto and connected with an available agent. After a successful call connection is made, the outdial application may again check the agent availability. If no agent is available, the outdial application may reschedule itself.

9 Claims, 5 Drawing Sheets

PROVIDING AGENT AVAILABILITY FOR AN OUTDIAL APPLICATION

CROSS-REFERENCE TO RELATED APPLICATIONS

This application is a continuation from U.S. patent application Ser. No. 14/212,210, filed Mar. 14, 2014, and entitled "PROVIDING AGENT AVAILABILITY FOR AN OUTDIAL APPLICATION", which is a continuation from U.S. patent application Ser. No. 11/864,075, filed Sep. 28, 2007, and entitled "PROVIDING AGENT AVAILABILITY FOR AN OUTDIAL APPLICATION", which is incorporated by reference herein in its entirety.

FIELD OF THE INVENTION

The present invention is generally related to call center technologies and, more particularly, to mechanisms for providing agent availability for an outdial application.

BACKGROUND OF THE INVENTION

Telephone call processing and switching systems of many types are known in the art. Such systems are used in telemarketing operations, telephone-based information systems, financial and insurance service operations, and public service centers, to name but a few examples. Automated or semi-automated call centers are examples of such systems, including functional features such as automatic call distributors (ACD), interactive voice response (IVR or VRU) systems, coordinated voice and data delivery, and outdial applications.

For example, telemarketing is a well-known form of remote commerce, that is commerce wherein the person making the sale or taking the sales data is not in the actual physical presence of the potential purchaser or customer. In general operation, a customer may call a toll-free telephone number, such as an 800 number. The number dialed is determined by the carrier as being associated with the telemarketer, and the call is delivered to the telemarketer's call center. A typical call center will have a front end with one or more VRU units, call switching equipment, an ACD, and several work stations having a telephone and computer terminal at which a live operator processes the call. The dialed number, typically taken automatically from the carrier through use of the dialed number identification service (DNIS), is utilized to effect a database access resulting in a "screen pop" of a script on the operator's computer terminal utilizing a computer telephone integration (CTI) network. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Alternatively, the call center may utilize an outdial application that dials phone numbers of customers in an automated fashion, and connects the dialed customer with an agent. To this end, the outdial application may interface with a database of telephone numbers from which phone numbers to be dialed are retrieved.

One disadvantage of call centers known to the art is that no automated mechanisms for determining agent availability for use in conjunction with an outdial application are known. Thus, contemporary call centers may attempt to over-utilize the capacity by placing calls when no agent is immediately available, or may alternatively under-utilize the call center capacity by entering an idle state when agents are available to take a call.

Therefore, what is needed is a mechanism that overcomes the described problems and limitations.

SUMMARY OF THE INVENTION

The present invention provides a system, method, and computer readable medium for utilizing agent availability by an outdial application. A routine may be periodically run, e.g., every five minutes, by an outdial server that evaluates agent availability in a call center backend. If any agents are available, the routine may schedule a pre-defined number of calls per available agent. The number of calls scheduled per available agent may be dependent on the type of call to be placed. A number of phone numbers corresponding to the number of scheduled calls may then be fetched by the routine from a phone number database. Once calls are initiated by the outdial server, the routine again checks if any agents are available. In the event that an agent is available, a scheduled phone number is retrieved, a call is placed thereto and connected with an available agent. After a successful call connection is made, the outdial application may again check the agent availability and initiate another call if another agent is available. If no agent is available, the outdial application may reschedule itself, e.g., go idle for a predetermined interval, thereby preventing calls from going in queue.

In one embodiment of the disclosure, a method for automated outdialing of phone numbers is provided. The method comprises determining a first number of agents available to process a phone call, retrieving a first predetermined number of phone numbers per available agent, determining an agent is available by an outdial application, placing a call to a retrieved phone number, and connecting the call with an agent determined to be available.

In another embodiment of the disclosure, a computer-readable medium having computer-executable instructions for execution by a processing system, the computer-executable instructions for automated outdialing of phone numbers is provided. The computer-readable medium includes instructions for determining a first number of agents available to process a phone call, retrieving a first predetermined number of phone numbers per available agent, determining an agent is available by an outdial application, placing a call to a retrieved phone number, connecting the call with an agent determined to be available, and awaiting an interval prior to determining a second number of available agents.

In a further embodiment of the disclosure, a system for providing automated outdialing of phone numbers is provided. The system comprises a call center front office including a automatic call distributor adapted to connect an agent with an outbound call, a plurality of agent stations communicatively coupled with the call center front office, wherein each of the plurality of agent stations are operated by a respective one of a plurality of agents, an interface to a carrier network for placing the outbound call to a customer, and an outdial server interfaced with a phone number database that stores a plurality of phone numbers. The outdial server runs an outdial application adapted to place outbound calls to customers in an automated manner, determines a first number of agents of the plurality of agents available to process a phone call, and retrieves a first predetermined number of phone numbers per available agent. The outdial application determines an agent is available, places a call to a retrieved phone number, connects the call with an agent determined to be available, and awaits an interval prior to determining a second number of available agents. The system may further include a bridge that terminates the call with the customer and the agent.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
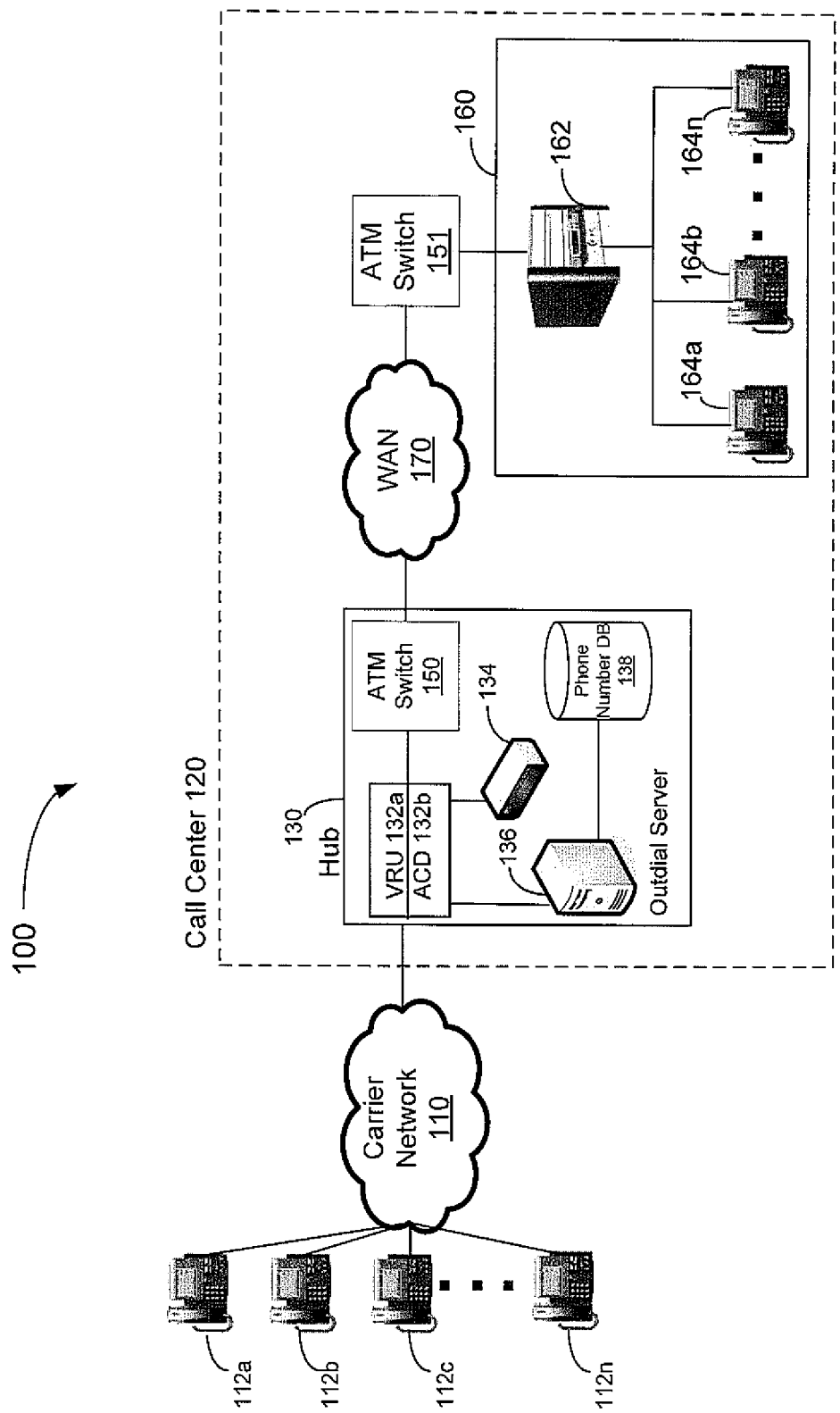
FIG. 1 is diagrammatic representation of a system that facilitates providing agent availability to an outdial application in accordance with an embodiment of the invention.

Now referring to FIG. 1, a system 100 that facilitates utilization of agent availability in conjunction with an outdial application in accordance with an embodiment of the invention is depicted. In the depicted system configuration, various customer telephone devices 112a-112n may be connected to a hub 130 of a call center 120 by a carrier network 110, e.g., the public switched telephone network (PSTN). Calls may be placed from hub 130 to one or more customers in an automated fashion by an outdial application. Hub 130 may include a voice response unit (VRU) 132a, and numerous VRUs may be deployed in hub 130. Voice response units are known in the art, and the details of the operation of the VRU will not be explained herein. Briefly, VRU 132a is a telecommunications computer, also called an Interactive Voice Response (IVR) unit, that responds to caller or called party entered touch-tone digits and/or to the voice input. VRU 132a may play digitally recorded speech that provides menu selections to the caller or called party. The customer may then enter the touch-tone digits that correspond to the desired menu selection or provide a voice response. The customer entered digits or voice commands can invoke options as varied as looking up account balances, moving the call within or to another system component, obtaining preliminary information from a caller, or playing a pre-recorded announcement for the caller. In a typical call center, the function of the VRU is to obtain preliminary call information, such as the caller's identity, customer information, preliminary transaction data, or the like. Hub 130 may also feature a automatic call distributor (ACD) 132b. ACD 132b comprises an application that distributes calls to a specific group of terminals that agents use or to a specific terminal of an agent. ACD 132b provides call routing based upon, for example, the availability of operators located at the remote sites or other call-routing decision criteria. VRU 132a and ACD 132b are collectively referred to herein as VRU/ACD 132.

Hub 130 may include or interface with a bridge 134 that functions to link telephone lines, i.e., a device at which call legs are terminated and connected. Additionally, an outdial server 136 may be included or interfaced with hub 130. Outdial server 136 runs an outdial application that may interface with or otherwise access a phone number database 138 that includes records of customer or potential customer phone numbers to be dialed. Outdial server 316 may place calls to customers that are terminated at bridge 134, and ACD 132 may connect the call with a particular agent. After the call is processed at VRU 132a of hub 130, VRU 132a may create a connection to a switch deployed in hub 130. As part of the process, VRU 132a may assign an internal DNIS that associates the call with its destination at the proper remote location, e.g., a call center agent station. The internal DNIS associated with the call by VRU 132a is used by the system to route the call to its proper destination.

After the call has been processed at the hub VRU and ACD, it is connected to a programmable hub switch by, for example, T1 voice trunk lines that in turn may route the call to an ATM switch 150 deployed in hub 130 by way of, for example, T1 voice trunk lines. ATM switch 150 provides a connection from hub 130 to the connectivity member, e.g., a wide area network (WAN) 170, for transmission of the call to the destination. In the illustrative example, the ATM transmission may terminate at an ATM switch 151 that interfaces with a call center back end 160, e.g., via a private branch exchange 162, that includes various call center stations including call center telephony devices 164a-164n operated by respective agents.

Agents operating devices 164a-164n may be assigned to agent groups that typically share one or more skill sets. Call center back end 160 may have any number of agent groups, and calls may be scheduled to a particular agent based at least in part of the skill set of the agent group. Each agent group with a subset of skills may have a unique agent group number or ID, or alternatively a skill group number. In accordance with an embodiment, a ratio of calls, N, to be scheduled per available agent may be configured based on an agent group as described more fully hereinbelow.

System 100 depicts a simplified exemplary network in which embodiments of the invention may be implemented and is provided only to facilitate an understanding of the disclosed embodiments. For example, WAN 170 may be implemented on any variety of data link and physical layer network infrastructure rather than ATM as depicted in FIG. 1. FIG. 1 is intended as an example, and not as an architectural limitation, of embodiments described herein.

In accordance with an embodiment, a script is periodically run, e.g., every five minutes, by outdial server 136 and evaluates agent availability in backend 160. If any agents are available, the script may schedule a pre-defined number of calls per available agent. The number of calls scheduled per available agent may be dependent on the type of call to be placed. A number of phone numbers corresponding to the number of scheduled calls may then be fetched by the script from phone number database 138. Once calls are initiated by outdial server 136, the outdial application again checks if any agents are available. In the event that an agent is available, a scheduled phone number is retrieved, a call is placed thereto and connected with an available agent. After a successful call connection is made, the outdial application may again check the agent availability and initiate another call if another agent is available. If no agent is available, the outdial application may reschedule itself, e.g., go idle for a predetermined interval, thereby preventing calls from going in queue.

Figure 2:
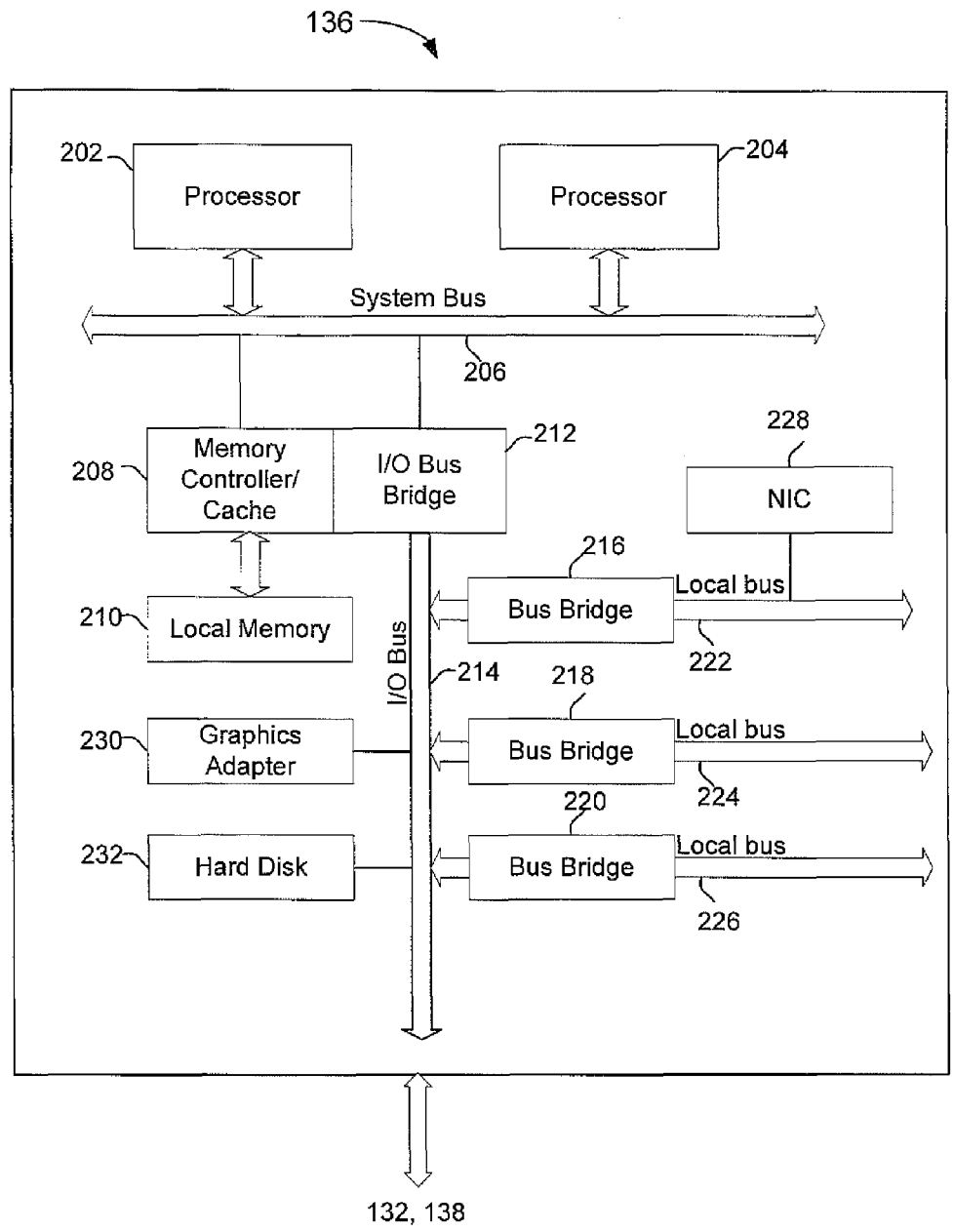
FIG. 2 is a diagrammatic representation of an exemplary embodiment of an outdial server depicted in FIG. 1.

FIG. 2 is a diagrammatic representation of an exemplary embodiment of an outdial server 136 depicted in FIG. 1. Code or instructions implementing procedures for processing utilizing agent availability information in conjunction with an outdial application according to embodiments disclosed herein may be located or accessed by outdial server 136.

Server 136 may be implemented as a symmetric multiprocessor (SMP) system that includes a plurality of processors 202 and 204 connected to a system bus 206, although other single-processor or multi-processor configurations may be suitably substituted therefor. A memory controller/cache 208 that provides an interface to local memory 210 may also be connected with system bus 206. An I/O bus bridge 212 may connect with system bus 206 and provide an interface to an I/O bus 214. Memory controller/cache 208 and I/O bus bridge 212 may be integrated into a common component.

A bus bridge 216, such as a Peripheral Component Interconnect (PCI) bus bridge, may connect with I/O bus 214 and provide an interface to a local bus 222, such as a PCI local bus. Communication links to other network nodes of system 100 in FIG. 1 may be provided through a network interface card (NIC) 228 connected to local bus 222 through add-in connectors. Additional bus bridges 218 and 220 may provide interfaces for additional local buses 224 and 226 from which peripheral or expansion devices may be supported. A graphics adapter 230 and hard disk 232 may also be connected to I/O bus 214 as depicted.

An operating system may run on processor system 202 or 204 and may be used to coordinate and provide control of various components within server 136. Instructions for the operating system and applications or programs are located on storage devices, such as hard disk drive 232, and may be loaded into memory 210 for execution by processor system 202 and 204.

Those of ordinary skill in the art will appreciate that the hardware depicted in FIG. 2 may vary. The depicted example is not intended to imply architectural limitations with respect to implementations of the present disclosure, but rather embodiments disclosed herein may be run by any suitable data processing system.

Figure 3:
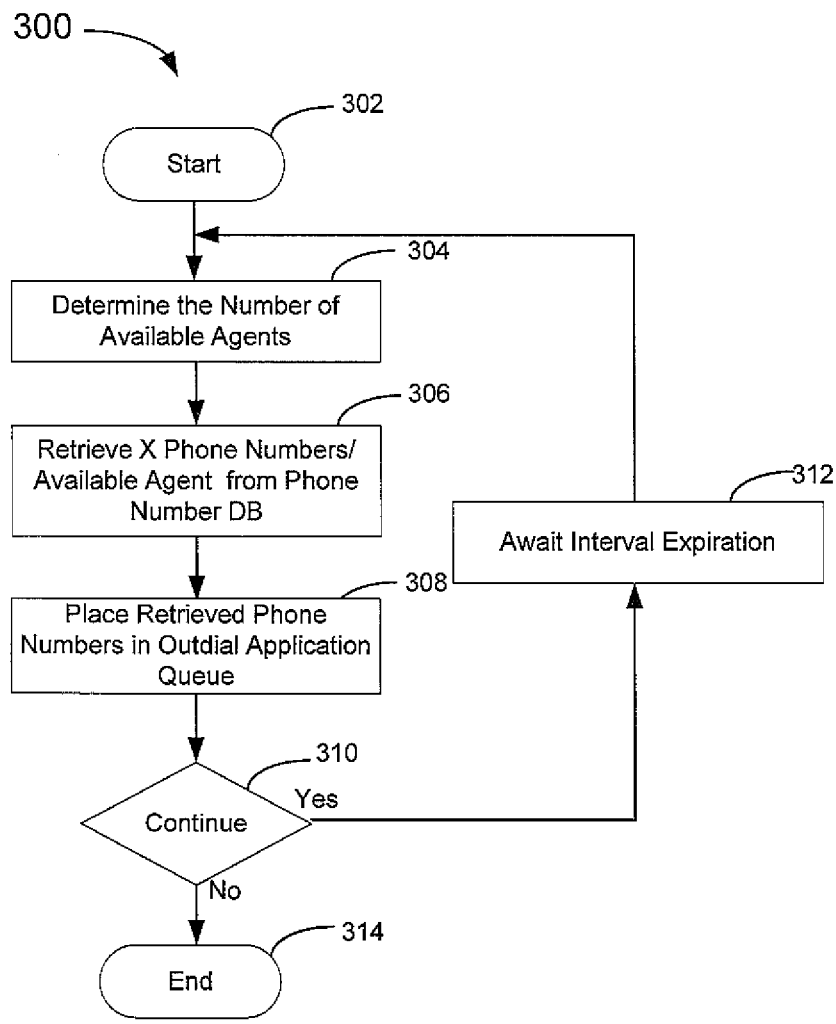
FIG. 3 is a flowchart that depicts processing of an outdial application routine that facilitates utilization of agent availability in accordance with an embodiment of the invention.

FIG. 3 is a flowchart 300 that depicts processing of an outdial application routine that facilitates utilization of agent availability in accordance with an embodiment of the invention. The processing steps of FIG. 3 may be implemented as computer-executable instructions executable by a processing system, such as outdial server 136.

The outdial application routine is invoked (step 302), and a determination of the number of agents currently available is made (step 304). The outdial application may then retrieve a predefined number, N, (referred to herein as a scheduling ratio) of phone numbers from phone number database 138 per available agent (step 306). The number of phone numbers, N, retrieved per available agent may dependent on the call type as well as the group of agents that are to be assigned to process the calls. In other implementations, the scheduling ratio, N, may be dynamically adjustable based on real-time conditions, such as an unexpected lull in live answers or, alternatively, a peak in live answers. For example, if the system senses that agents are idle for too long, then the ratio can be increased. If the system senses the queue is too high, it can be decreased. This feature can be turned on/off based on client needs. The dynamic adjustment of the scheduling ratio, N, is described more fully hereinbelow with reference to FIG. 4.

The phone numbers retrieved from phone number database 138 are then placed in an outdial application queue that contains phone numbers scheduled to be called by the outdial application (step 308). An evaluation may then be made to determine if the outdial application routine is to continue (step 310). In the event the outdial application is to continue, the outdial application may proceed to await expiration of an interval (step 312) prior to again determining the number of agents that are available. The interval may, for example, comprise a pre-defined period, such as five minutes. If it is determined that the outdial application routine is not to continue at step 310, the application routine cycle may terminate (step 314).

On second or subsequent iterations of the application routine depicted in FIG. 3, the number of phone numbers retrieved at step 306 may be adjusted in accordance with the number, if any, of scheduled phone numbers still remaining to be called. In this manner, the number of phone numbers retrieved for scheduled calls may be balanced with the actual number of outdialed calls being made over a period of time.

In accordance with an embodiment, agents at a call center may be assigned to agent groups that typically share one or more skill sets. A call center may have any number of agent groups per location, and calls may be scheduled per agent group. Each agent group with a subset of skills may have a unique agent group number or ID, or alternatively a skill group number. The ratio of calls, N, to be scheduled per available agent may be configured based on an agent group. For example, one agent group might only be able to sell, one may only be able to up-sell, and one may be able to do both. Each respective group may have different call ratios assigned to them based on the skill set of the agents, measured performance metrics of the agents, or other criteria.

In other embodiments, the number of agent calls, N, to be scheduled per available agent may be dependent on a time of day, day of week, day of month, or day of year. Additionally, the scheduled call ratio may be configured via a call center client web interface. This allows for the best possible handling of calls during peak calling times, holidays, etc. Thus, the number of scheduled calls may be based on an agent group ID, dates and times of days, and may be adjusted based on measured metrics, such as agent idle time or heavy queue load measures.

Figure 4:
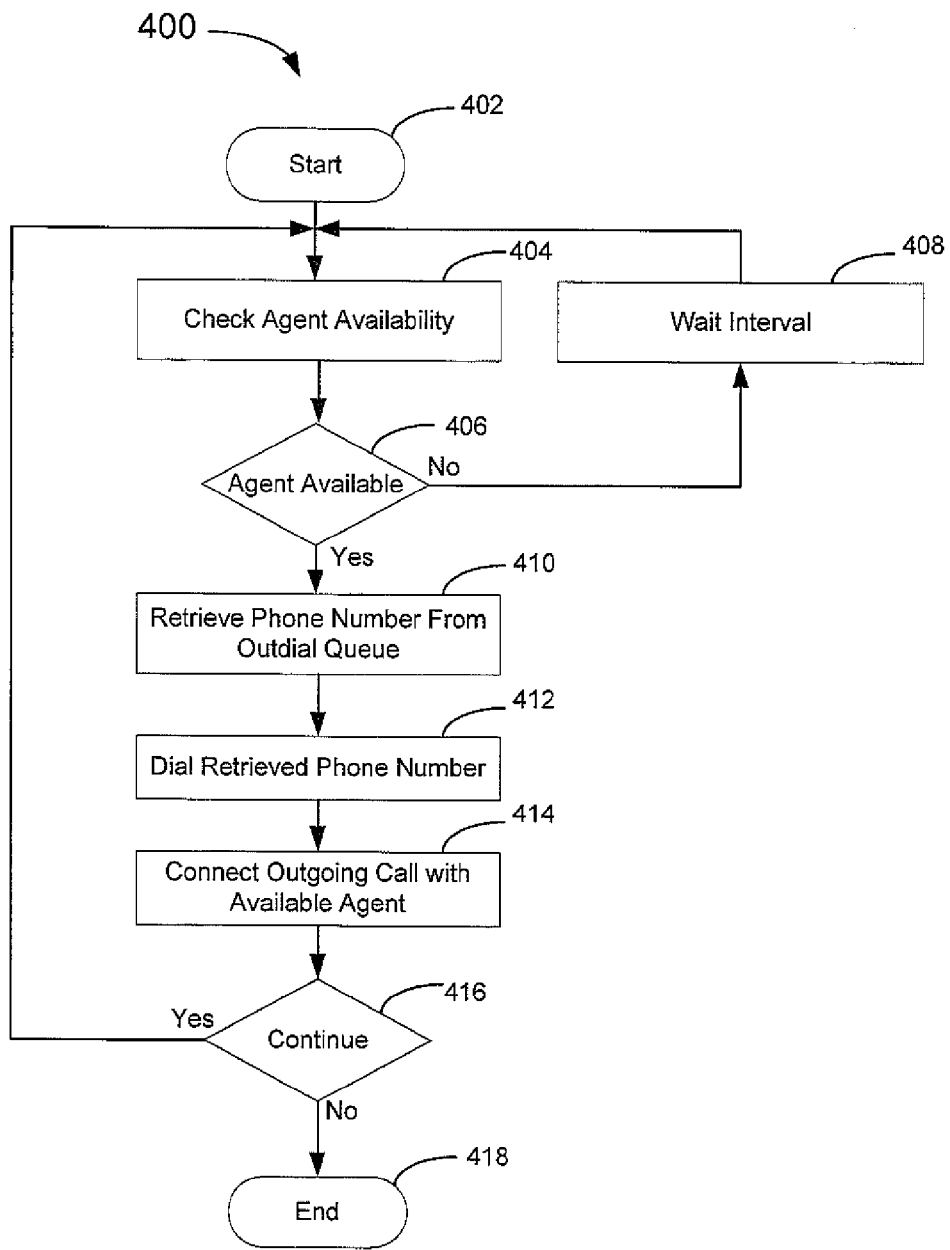
FIG. 4 is a flowchart depicting processing of an outdial application subroutine that facilitates utilization of agent availability for scheduling calls in accordance with an embodiment of the invention.

FIG. 4 is a flowchart 400 depicting processing of an outdial application subroutine that facilitates utilization of agent availability in accordance with an embodiment of the invention. The processing depicted in FIG. 4 may be implemented as a subroutine of the outdial application procedure depicted in FIG. 3. Particularly, the outdial application processing of FIG. 4 may be implemented as a subroutine generally corresponding to step 306 that adjusts the ratio of phone numbers selected for outdial scheduling based on the number of available agents.

The outdial application subroutine is invoked (step 402), and an agent group ID may optionally be read (step 404). The scheduling ratio, N, assigned to the group ID is then read (step 406). The agent idle time may be monitored as well as the queue load (step 408). The agent idle time may be compared with a pre-defined idle time threshold to determine if the agent idle time exceeds the threshold (step 410). If the agent idle time exceeds the idle time threshold, the scheduling ratio, N, may be increased as a function of the excessive idle time (step 412) thereby increasing the number of phone numbers retrieved for scheduling per available agent. A number of phone numbers, N, may then be retrieved for scheduling (step 418).

Returning again to step 410, if the agent idle time does not exceed the idle time threshold, the measured queue load may be compared with a queue load threshold (step 414). If the queue load exceeds the queue load threshold indicating that too many call are being scheduled for the current agent performance, the scheduling ratio, N, may be reduced as a function of the excess queue load (step 416) thereby decreasing the number of phone numbers retrieved for scheduling per available agent. N phone number per available agent may then be retrieved for scheduling according to step 418, and the outdial application subroutine cycle may end (step 420).

Figure 5:
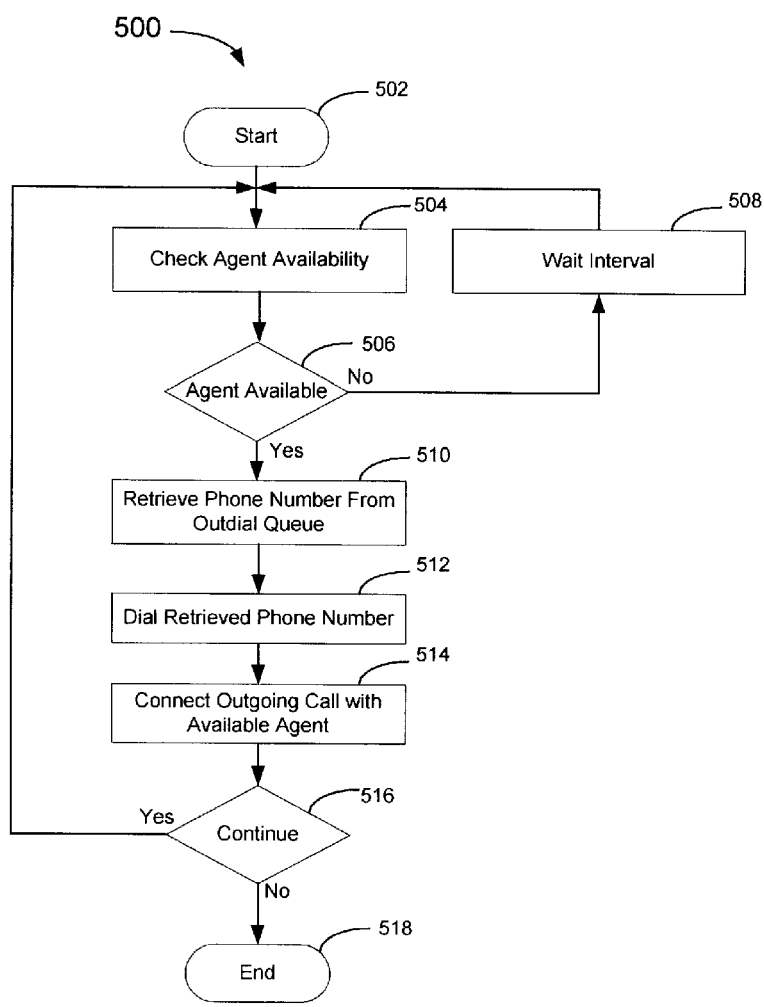
FIG. 5 is a flowchart depicting an outdial application subroutine for placing calls in an automated manner that are to be connected with available agents in accordance with an embodiment of the invention.

FIG. 5 is a flowchart 500 depicting an outdial application subroutine for placing calls in an automated fashion that are to be connected with available agents in accordance with an embodiment of the invention. The processing steps of FIG. 5 may be implemented as computer-executable instructions executable by a processing system, such as outdial server 136.

The outdial application subroutine is invoked (step 502), and a determination of the number of agents available is made (step 504). An evaluation may then be made to determine if any agents are available (step 506). If no agent is available, the subroutine may proceed to await expiration of an interval (step 508) prior to again evaluating any agent availability.

If an agent is determined to be available, the outdial subroutine may retrieve a phone number from the phone numbers previously retrieved by the outdial application (step 510). The retrieved phone number is then dialed (step 512), and the outgoing call is connected with an available agent (step 514). Upon successful connection of the outbound call with an available agent, an evaluation may be made to determine if the outdial subroutine is to continue (step 514). If it is determined that the outdial subroutine is to continue, the subroutine may proceed to again check the agent availability according to step 504. Upon a determination that the outdial subroutine is not to continue, the outdial subroutine may terminate (step 518).

As described, mechanisms for utilizing agent availability by an outdial application are provided. A routine may be periodically run, e.g., every five minutes, by an outdial server that evaluates agent availability in a call center backend. If any agents are available, the routine may schedule a predefined number of calls per available agent. The number of calls scheduled per available agent may be dependent on the type of call to be placed. A number of phone numbers corresponding to the number of scheduled calls may then be fetched by the routine from a phone number database. The number of phone numbers scheduled per available agent may be dynamically adjustable based on real-time conditions, such as an unexpected lull in live answers or, alternatively, a peak in live answers. Once calls are initiated by the outdial server, the routine again checks if any agents are available. In the event that an agent is available, a scheduled phone number is retrieved, a call is placed thereto and connected with an available agent. After a successful call connection is made, the outdial application may again check the agent availability and initiate another call if another agent is available. If no agent is available, the outdial application may reschedule itself, e.g., go idle for a predetermined interval, thereby preventing calls from going in queue.

The flowchart of FIGS. 3-5 depict process serialization to facilitate an understanding of disclosed embodiments and are not necessarily indicative of serialization of the operations being performed. In various embodiments, the processing steps described in FIGS. 3-5 may be performed in varying order, and one or more depicted steps may be performed in parallel with other steps. Additionally, execution of some processing steps of FIGS. 3-5 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   determining, by an outdial server, a first group of agents available to process a phone call, the outdial server interfaced with a telephone number database that stores a plurality of phone numbers, wherein the outdial server runs an outdial application adapted to place outbound calls to customers in an automated manner;
   wherein the first group of agents is selected from a plurality of groups of agents, and each respective group of agents has an assigned call ratio based on a skill set of agents within the respective group;

adjusting, by the outdial server, a first predetermined number of phone numbers to be retrieved based on an agent idle time, a queue load of calls assigned to the first group of agents and based on an unexpected lull in live answers or a peak in live answers;

retrieving, by the outdial server, the adjusted first predetermined number of phone numbers per available agent based on a call type and the first group of agents assigned to process the phone call;

measuring, by the outdial server, the idle time of the first group of agents;

comparing, by the outdial server, the idle time of the first group of agents with an idle time threshold, wherein the adjusting the first predetermined number of phone numbers is based on an amount of the idle time for the first group of agents that exceeds the idle time threshold;

measuring, by the outdial server, the queue load of calls assigned to the first group of agents;

comparing, by the outdial server, the queue load with a queue load threshold, wherein the adjusting the first predetermined number of phone numbers is based on an amount of the queue load of calls that exceeds the queue load threshold;

determining, by the outdial server, an agent from the first group of agents is available by the outdial application;

connecting, by the outdial server, a call placed by the outdial application, with the agent determined to be available;

retrieving, by the outdial server, a second predetermined number of phone number per a second group of available agents, wherein the second predetermined number of phone number is adjusted in relation to a number of remaining phone number to be called of the first predetermined number; and awaiting, by the outdial server, a predefined interval of time prior to determining the second group of available agents.

2. The method of claim 1, wherein the outdial application determines the agent is not available to process the call, the method further comprising awaiting an interval prior to determining if the agent is available.

3. The method of claim 1, further comprising determining if another agent is available by the outdial application upon connecting the call with the agent.

4. A non-transitory computer-readable medium having computer-executable instructions for execution by a processing system, the non-transitory computer-readable medium comprising instructions for:

determining, by an outdial server, a first group of agents available to process a phone call; the outdial server interfaced with a telephone number database that stores a plurality of phone numbers, wherein the outdial server runs an outdial application adapted to place outbound calls to customers in an automated manner;

wherein the first group of agents is selected from a plurality of groups of agents, and each respective group of agents has an assigned call ratio based on a skill set of agents within the respective group;

adjusting, by the outdial server, a first predetermined number of phone numbers to be retrieved based on an agent idle time, a queue load of calls assigned to the first group of agents and based on an unexpected lull in live answers or a peak in live answers;

retrieving, by the outdial server, the adjusted first predetermined number of phone numbers per available agent based on a call type and the first group of agents assigned to process the phone call;

measuring, by the outdial server, the idle time of the first group of agents;

comparing, by the outdial server, the idle time of the first group of agents with an idle time threshold, wherein the adjusting the first predetermined number of phone numbers is based on an amount of the idle time for the first group of agents that exceeds the idle time threshold;

measuring, by the outdial server, the queue load of calls assigned to the first group of agents;

comparing, by the outdial server, the queue load with a queue load threshold, wherein the adjusting the first predetermined number of phone numbers is based on an amount of the queue load of calls that exceeds the queue load threshold;

determining, by the outdial server, an agent from the first group of agents is available by the outdial application;

connecting, by the outdial server, a call placed by the outdial application with the agent determined to be available;

retrieving, by the outdial server, a second predetermined number of phone number per a second group of available agents, wherein the second predetermined number of phone numbers is adjusted in relation to a number of remaining phone numbers to be called of the first predetermined number; and awaiting, by the outdial server, a predefined interval of time prior to determining the second group of available agents.

5. The non-transitory computer-readable medium of claim 4, wherein the outdial application determines the agent is not available to process the call, the computer-readable medium further comprising instructions for awaiting an interval prior to determining if the agent is available.

6. The non-transitory computer-readable medium of claim 4, further comprising instructions for determining if another agent is available by the outdial application upon connecting the call with the agent.

7. A system, comprising:

a call center front office including an automatic call distributor adapted to connect an agent with an outbound call;

a plurality of agent stations communicatively coupled with the call center front office, wherein each of the plurality of agent stations are operated by a respective one of a plurality of agents;

an interface to a carrier network for placing the outbound call to a customer;

an outdial server interfaced with a telephone number database that stores a plurality of phone numbers, wherein the outdial server runs an outdial application adapted to place outbound calls to customers in an automated manner;

wherein the outdial server is disposed in the call center front office, and wherein the call center front office is communicatively coupled with a public switched telephone network;

wherein the outdial server determines a first group of agents available to process a phone call;

wherein the first group of agents is selected from a plurality of groups of agents, and each respective group of agents has an assigned call ratio based on a skill set of agents within the respective group;

wherein the outdial server adjusts a first predetermined number of phone numbers to be retrieved based on an agent idle time, a queue load of calls assigned to the first group of agents and based on an unexpected lull in live answers or a peak in live answers;

wherein the outdial server retrieves the adjusted first predetermined number of phone numbers per available agent based on a call type and the first group of agents assigned to process the phone call;

wherein the outdial server measures the idle time of the first group of agents;

wherein the outdial server compares the idle time of the first group of agents with an idle time threshold, wherein the adjusting the first predetermined number of phone numbers is based on an amount of the idle time for the first group of agents that exceeds the idle time threshold;

wherein the outdial server measures the queue load of calls assigned to the first group of agents;

wherein the outdial server compares the queue load with a queue load threshold, wherein the adjusting the first predetermined number of phone numbers is based on an amount of the queue load of calls that exceeds the queue load threshold;

wherein the outdial server determines an agent from the first group of agents is available by the outdial application;

wherein the outdial server connects a call with the agent determined to be available;

wherein the outdial server retrieves a second predetermined number of phone number per a second group of available agents, wherein the second predetermined number of phone number is adjusted in relation to a number of remaining phone number to be called of the first predetermined number;

wherein the outdial server awaits a predefined interval of time prior to determining the second group of available agents; and a bridge that terminates the call with the customer and the agent.

8. The system of claim 7, wherein the outdial application determines the agent is not available to process the call, and wherein the outdial server awaits an interval prior to determining if the agent is available.

9. The system of claim 7, wherein the outdial application determines if another agent is available upon connecting the call with the agent.

* * * * *